(12) United States Patent
Popov et al.

(10) Patent No.: US 10,115,328 B2
(45) Date of Patent: Oct. 30, 2018

(54) DISPLAYING APPARATUS AND METHOD

(71) Applicant: SAMSUNG ELECTRONICS CO., LTD., Suwon-si (KR)

(72) Inventors: Mikhail Vyacheslavovich Popov, Moscow (RU); Stanislav Aleksandrovich Shtykov, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 15/265,997

(22) Filed: Sep. 15, 2016

(65) Prior Publication Data

US 2017/0085866 A1     Mar. 23, 2017

(30) Foreign Application Priority Data

Sep. 18, 2015    (RU) ................................ 2015139883

(51) Int. Cl.
    *H04N 13/32*        (2018.01)
    *G09G 3/02*         (2006.01)
    *H04N 13/363*       (2018.01)

(52) U.S. Cl.
    CPC ............ *G09G 3/025* (2013.01); *H04N 13/32* (2018.05); *H04N 13/363* (2018.05); *G09G 2340/04* (2013.01)

(58) Field of Classification Search
None
See application file for complete search history.

(56) References Cited

U.S. PATENT DOCUMENTS

| | | | |
|---|---|---|---|
| 7,944,465 B2 | 5/2011 | Goulanian et al. | |
| 8,334,889 B2 | 12/2012 | Blanche et al. | |
| 8,345,088 B2 | 1/2013 | Harrold et al. | |
| 2005/0111100 A1 | 5/2005 | Mather et al. | |
| 2006/0176541 A1 | 8/2006 | Woodgate et al. | |
| 2007/0035512 A1 | 2/2007 | Kim et al. | |
| 2009/0185141 A1* | 7/2009 | Chen ................... | G02B 27/48 353/38 |

(Continued)

FOREIGN PATENT DOCUMENTS

| | | |
|---|---|---|
| RU | 2505937 C2 | 8/2012 |
| RU | 2518484 C2 | 6/2014 |
| WO | 2014/133481 A1 | 9/2014 |

OTHER PUBLICATIONS

Communication dated Jun. 22, 2016, issued by the Russian Patent Office in counterpart Russian application No. 2015139883/07(061331).

*Primary Examiner* — Eileen M Adams
(74) *Attorney, Agent, or Firm* — Sughrue Mion, PLLC

(57) ABSTRACT

The present disclosure relates to imaging techniques, and more particularly, to a display device configured to generate and display a 2D or 3D image having an increased image size in vertical and/or horizontal directions, an increased image viewing angle and improved image resolution. The technical result of the present disclosure is to increase the size of a displayed image in at least one direction, while simultaneously providing an increased image viewing angle and improved image resolution in the at least one direction. The display device includes an controller, an display, a spatial-to-angular distribution transformer, an image relay and scanner, and a screen.

20 Claims, 15 Drawing Sheets

(56) References Cited

U.S. PATENT DOCUMENTS

| | | | |
|---|---|---|---|
| 2012/0062998 A1* | 3/2012 | Schultz | B29D 11/00663 359/630 |
| 2013/0314512 A1* | 11/2013 | Watanabe | H04N 13/0402 348/51 |
| 2015/0033539 A1 | 2/2015 | El-Ghoroury et al. | |

* cited by examiner

DISPLAYING APPARATUS AND METHOD

CROSS-REFERENCE TO RELATED APPLICATION

This application claims the benefit of Russian Patent Application No. 2015139883 filed with The Russian Federal Service for Intellectual Property on Sep. 18, 2015, the disclosure of which is incorporated herein in its entirety by reference.

FIELD OF THE INVENTION

The present disclosure relates to imaging techniques, and more particularly, to a display device configured to generate and display a 2D or 3D image with an increased image size in vertical and/or horizontal directions, an increased image viewing angle, and improved image resolution. The invention may be applied to various glass-free multi-view 3D displays, TVs, projectors, augmented reality devices, etc., capable of displaying either conventional 2D or also 3D images or videos viewable by a user. The disclosure may be used for various applications, such as entertainment, education, advertisement, medicine, art, etc.

BACKGROUND OF THE INVENTION

At present time, known and promising 3D display technologies based on integral imaging, parallax barrier, volumetric imaging, holography-based techniques, or any combination thereof, etc. have been or are being developed.

The most widely used 3D display technology is a stereo imaging technique providing individual and independent flat images for left and right eyes of a viewer. The left eye can see only "left" images, but cannot see "right" images, and vice versa for the right eye. Such a technique is usually realized by means of glasses, either active or passive. Thus, the demerit of this technique is that additional equipment (i.e. glasses) is required. At the same time, a key issue is that the stereo imaging technique shows a viewer only two flat images without the possibility of parallax control.

There are a lot of different prior art solutions which eliminate the above-indicated drawbacks. One such solution, disclosed in WO 2014133481 A1, provides a multi-view 3D telepresence system including an integral imaging system and a direct view display system. The integral imaging system has a microlens array and a plurality of image sensors to generate a plurality of input image views. The direct view display system has a directional backplane with a plurality of directional pixels to scatter a plurality of input planar light beams into a plurality of directional light beams. The direct view display system also includes a shutter layer for modulating the plurality of directional light beams generated by the plurality of directional pixels. The plurality of directional pixels enables the direct view display system to reproduce the captured images. A viewer can feel as if he or she is present at the time an image is captured, even though the viewer may be many miles away. The viewer is thus able to enjoy full parallax, 3D, and a real-time telepresence experience. In one example, the reproduced images may be displayed at a different scale than the captured images. This may be the case where images are captured in one scale (e.g., microscopic) and displayed at another scale (e.g., full scale or zoomed in). However, the system proposed above is not capable of increasing a 3D screen size and viewing angle and enhancing 3D image quality.

U.S. Pat. No. 7,944,465 B2 describes a system for reproducing 3-dimensional images. The system is based on the integral imaging technique and uses an additional pair of lens rasters with actuators, which provides a 3D display having a sufficiently wide field of view for simultaneous viewing of the 3D display by multiple viewers. However, the system has a limited screen size and limited 3D resolution, and although an additional well-aligned pair of moving rasters included in the system increases viewing area, a current viewing angle value remains the same.

US 20070035512 A1 discloses a 3D image display device using an integral technology that offers a principle of increasing of a 3D viewing angle by using a concave-flat lens raster having an additional material covering the same. The additional material has a refractive index less than that of the lens raster, which leads to extending of the viewing angle of a 3D image. However, the device has a limited screen size and limited 3D resolution.

Thus, there is a need for a glass-free display device capable of increasing image size in at least one direction and providing an increase in image viewing angle and resolution.

SUMMARY OF THE INVENTION

To eliminate or mitigate one or more of the above-mentioned drawbacks of the prior art solutions, an example embodiment of the present disclosure is provided as characterized by an independent claim of appended claims. Different example embodiments of the present disclosure are characterized by dependent claims of the appended claims.

The technical result of the present disclosure is to increase the size of a displayed image in at least one direction, while simultaneously providing an increased viewing angle and improved image resolution in said at least one direction.

For this purpose, the present disclosure provides a display device. The device includes: a controller, a display, a spatial-to-angular distribution transformer, an image relay and scanner, and a screen. The controller may receive a sequence of image frames constituting an initial image from an image source, process the sequence of image frames, and generate a control signal based on the sequence of image frames. The display may generate, based on the control signal from the controller, a spatial light distribution pattern corresponding to the sequence of image frames. The spatial-to-angular distribution transformer may transform the spatial light distribution pattern to an angular light distribution pattern and generate at least two parallax images associated with the sequence of image frames based on the angular light distribution pattern. The image relay and scanner may generate a fused image based on the at least two parallax images. The screen may display the fused image. The image relay and scanner may magnify the at least two parallax images in a first direction and a second direction, the first direction being perpendicular to the second direction; position, after the magnification, the at least two parallax images in at least one of the first and second directions such that there is no gap or overlap between the at least two magnified parallax images in the at least one of the first and second directions; and generate, after the positioning, the fused image based on the at least two magnified parallax images to form the fused image, the fused image being a magnified version of the initial image. The screen may display the fused image generated as noted above.

In an example embodiment, the display comprises a spatial light modulator (SLM) and an SLM illuminator which may illuminate the SLM. The SLM illuminator includes: at least one light source configured to generate an illumination beam; a polarizer configured to polarize the illumination beam such that the illumination beam is in a first polarization state; a diffuser configured to diffuse the illumination beam, wherein the diffusing includes scattering the illumination beam; an illumination beam expander configured to expand the diffused illumination beam output by the diffuser; an exit aperture configured to crop the expanded illumination beam; folding mirrors configured to reflect the illumination beam after cropping by the exit aperture; and a polarizing beam-splitter (PBS) configured to reflect and direct the illumination beam reflected from the folding mirrors to the SLM. After reflection by the PBS, the illumination beam is in a second polarization state different from the first polarization state. Further, the SLM may reflect and spatially modulate the illumination beam, and after the illumination beam is reflected from and spatially modulated by the SLM, the PBS may transmit the illumination beam towards the spatial-to-angular distribution transformer as the spatial light distribution pattern. The first polarization state may be an s-state, and the second polarization state may be a p-state, or vice versa. The illumination beam expander may include an aperture having a variable size. The SLM may be based on any type of LCD, LCoS, FLCoS, DMD, MEMS, OLED, OASLM, or EOSLM technology.

In an example embodiment, the device further includes an image relay and optical filter arranged between the display and the spatial-to-angular distribution transformer. The image relay and optical filter may scale and filter the spatial light distribution pattern transformer generated by the display before the spatial-to-angular distribution transformer transforms the spatial light distribution pattern to the angular light distribution pattern. The image relay and optical filter may include one or more lenses and one or more apertures.

In an example embodiment, the spatial-to-angular distribution transformer comprises a 1D or 2D array of transforming elements having symmetrical or anamorphic properties. Each of the transforming elements may generate an image pixel which may be seen differently by a user based on a viewpoint of the user.

In an example embodiment, the screen is transmissive or reflective, partially transmissive and reflective, or has diffusing properties.

In an example embodiment, the image relay and scanner includes: at least one anamorphic lens system, a scanner, and a driver. The at least one anamorphic lens system may magnify the at least two parallax images in the first direction, by a value greater than one, and in the second direction, by a value less than one. The scanner may position the magnified parallax images in the at least one of the first and second directions. The driver may drive movement of the scanner. Furthermore, the control signal from the controller may include data indicating movement of the scanner, and the driver may drive movement of the scanner for repositioning the magnified parallax images, based on the control signal. The movement of the scanner included in the data may include a deviation amplitude. The size and resolution of the fused image in the at least one of the first and second directions may be proportional to the deviation amplitude of the scanner.

In an example embodiment, the scanner may include at least one mirror and a shaft on which the at least one mirror is mounted, the shaft being coupled to the driver. The driver may drive rotation of the shaft about a shaft axis, and the rotation of the shaft may move the at least one mirror in the at least one of the first and second directions.

In an example embodiment, the operation of the scanner is based on an electro-optical effect, a magneto-optical effect, a piezo-optical effect, or a combination thereof. In this case, the driver may be configured to cause such effect(s) in the scanner, for example, by applying an external electric and/or magnetic field.

In an example embodiment, the first direction is a vertical direction and the second direction is a horizontal direction, or vice versa.

The proposed device may be integrated into or implemented as one of: a monitor, a TV, a projector, and an augmented reality device.

In an example embodiment, a displaying method is provided. The displaying method comprises: receiving a sequence of image frames constituting an initial image from an external image source; generating a control signal based on the sequence of image frames; generating, based on the control signal, a spatial light distribution pattern corresponding to the sequency of image frames; transforming the spatial light distribution pattern to an angular light distribution patter; generating at least two parallax images associated with the sequency of image frames based on the angular light distribution pattern; and displaying a fused image generated based on the at least two parallax images.

In an example embodiment, the displaying method further comprises magnifying, before the displaying the fused image, the at least two parallax images in a first direction and a second direction, the first direction being perpendicular to the second direction; positioning the at least two magnified parallax images in at least one of the first and second directions such that there is no gap or overlap between the at least two magnified parallax images; and generating the fused image which is a magnified version of the initial image.

Other features and advantages of the present disclosure will be apparent upon reading the following detailed description and reviewing the accompanying drawings.

BRIEF DESCRIPTION OF THE DRAWINGS

The essence of the present disclosure is explained below with reference to the accompanying drawings in which.

DETAILED DESCRIPTION OF THE INVENTION

Various embodiments of the present disclosure are further described in more detail with reference to the appended drawings. However, the present disclosure may be embodied in many other forms and should not be construed as limited to any structure or function presented in the following description. In contrast, these embodiments are provided to make the description of the present disclosure detailed and complete. According to the present description, it will be apparent to a skilled artisan that the scope of the present disclosure covers any embodiment of the present disclosure which is disclosed herein, irrespective of whether this embodiment is implemented independently or in concert with any other embodiment of the present disclosure. For example, the device disclosed herein may be implemented in practice by using any number of example embodiments provided herein. Furthermore, it should be understood that any embodiment of the present disclosure may be implemented using one or more of the elements presented in the appended claims.

The word "exemplary" is used herein in the meaning of "used as an example or illustration". Any embodiment described herein as "exemplary" should not be necessarily construed as preferable or having an advantage over other embodiments.

Furthermore, directional terminology, such as "horizontal", "vertical", "before", "behind", etc., is used with reference to the orientation of the Figure(s) being described. Because components of embodiments of the present disclosure may be positioned in a number of different orientations, the directional terminology is used for purposes of illustration and does not provide any limitation. It is to be understood that other embodiments may be utilized and structural or logical changes may be made without departing from the scope of the present disclosure.

Figure 1A:
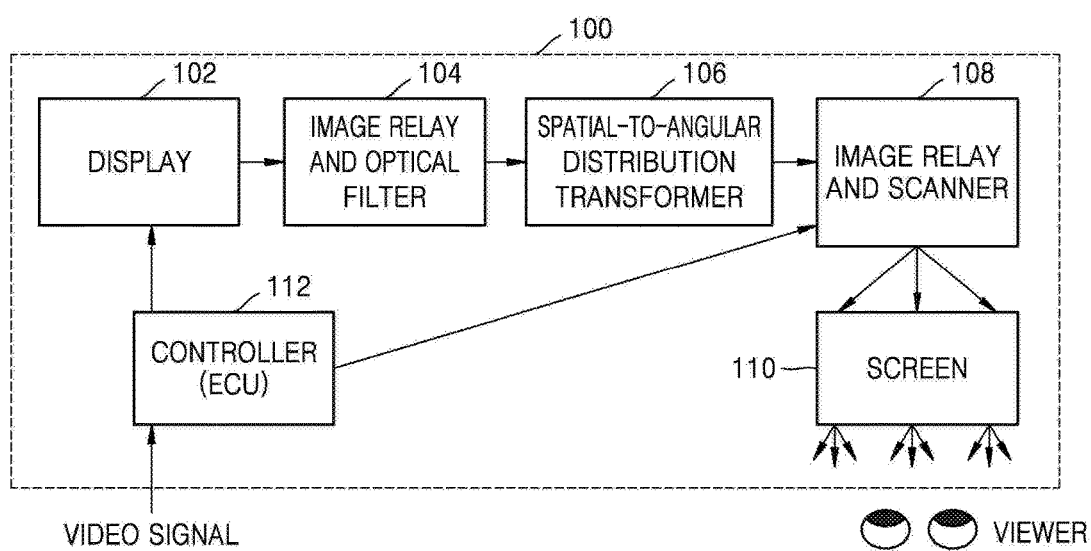
FIGS. 1A through 1B illustrate two possible schemes of a display device in accordance with example embodiments of the present disclosure.
Figure 1B:
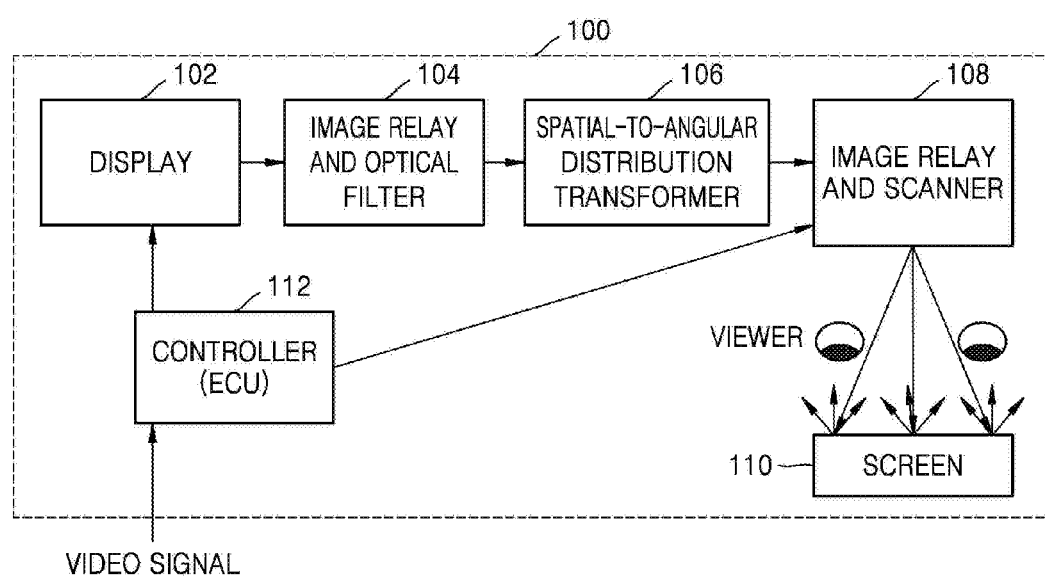

FIGS. 1A through 1B illustrate designs of a display device 100 in accordance with example embodiments of the present disclosure. The differences between FIG. 1A and FIG. 1B will be explained further after the listing and description of constructive components included in the display device.

Referring to FIGS. 1A through 1B, the display device 100 may include a display 102, an image relay and optical filter 104, a spatial-to-angular distribution transformer 106, an image relay and scanner 108, a screen 110, and a controller (ECU: an Electronic Controlling Unit) 112. The operation of the display device 100 will be now described briefly.

The display 102 may generate a spatial light distribution pattern corresponding to an image to be displayed or any part of the image. In generating such a spatial light distribution pattern, the display 102 may receive instructions from the ECU 112. In particular, the ECU 112 may provide the display 102 with a control signal indicating a spatial light distribution pattern to be generated by the display 102. The ECU 112 may generate the control signal based on a sequence of image frames constituting the image. The sequence of frames may be sent from an internal image source and/or an external image source such as a video camera. The sequence of image frames may be presented, for example, as a video signal from a video camera or any other device(s) capable of capturing images or image frames.

After the display 102 generates the spatial light distribution pattern the display 102 may send spatial light distribution pattern to the image relay and optical filter 104. The image relay and optical filter 104 may scale and filter the spatial light distribution pattern.

Next, the image relay and optical filter 104 may provide the spatial light distribution pattern to the spatial-to-angular distribution transformer 106. It is worth noting that the image relay and optical filter 104 is an optional component, and the display device 100 may operate with or without the use of image relay and optical filter 104. Therefore, alternatively, the display 102 may send spatial light distribution pattern directly to the spatial-to-angular distribution transformer 106.

The spatial-to-angular distribution transformer 106 may generate at least two parallax images by using spatial-to-angular distribution transformation which transforms the spatial light distribution pattern to an angular light distribution pattern. Further, the spatial-to-angular distribution transformer 106 may provide the parallax images to the image relay and scanner 108.

The image relay and scanner 108 may generate a fused image based on the at least two parallax images. More specifically, the image relay and scanner 108 may: (i) magnify the at least two parallax images in a first direction and a second direction, the first direction being perpendicular to the second direction; (ii) position, after the magnification, the at least two parallax images in at least one of the first and second directions such that there is no gap or overlap between the at least two the parallax images in the direction or directions (i.e., correct, after the magnification, for any positional deviations of the at least two parallax images); and (iii) generate, after the positioning, the fused image from the at least two parallax images. The fused image may be a magnified version of the image initially supplied by the external image source to the ECU 112 as a sequence of image frames. The display device 100 may display the fused image to a viewer via the screen 110.

The first and second directions may be horizontal and vertical directions, respectively. For example, if the sequence of frame images constitutes an A4-size picture, the horizontal direction may be a direction along a shorter picture side and the vertical direction may be a direction along a longer picture side, or vice versa. However, the present disclosure is not limited to such direction definitions, and any other mutually perpendicular directions may be used (for example, mutually perpendicular oblique directions may be used), as should be apparent to those skilled in the art.

FIG. 1A differs from FIG. 1B in the implementation of the screen 110. In particular, FIG. 1A illustrates the screen 110 implemented as a transmissive screen, while FIG. 1B illustrates the screen 110 implemented as a reflective screen. Depending on which of the screen types is used, the viewer can see the displayed image from a location behind the screen 110 (e.g., a location between the image relay and scanner 108 and the screen 110) or a location in front of the screen 110. At the same time, it should be apparent to those skilled in the art that such screen types are only illustrative and not limitative, and other screen types may be used.

The implementation of each of the constructive elements 102-112 will be now described in more detail.

Figure 2A:
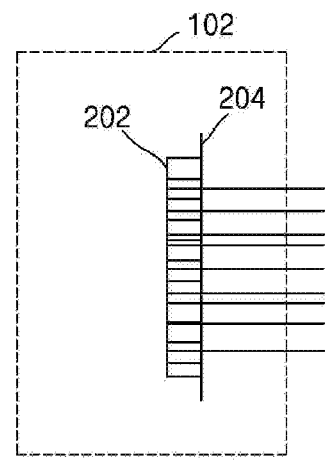
FIGS. 2A through 2C illustrate three possible schemes of an display in accordance with an example embodiment of the present disclosure.
Figure 2B:
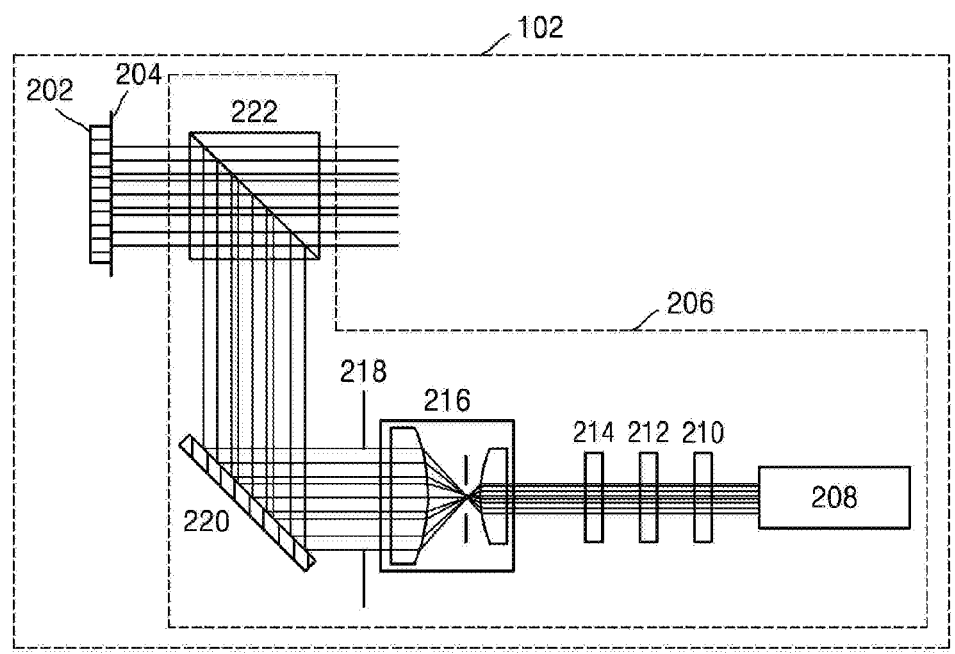
Figure 2C:
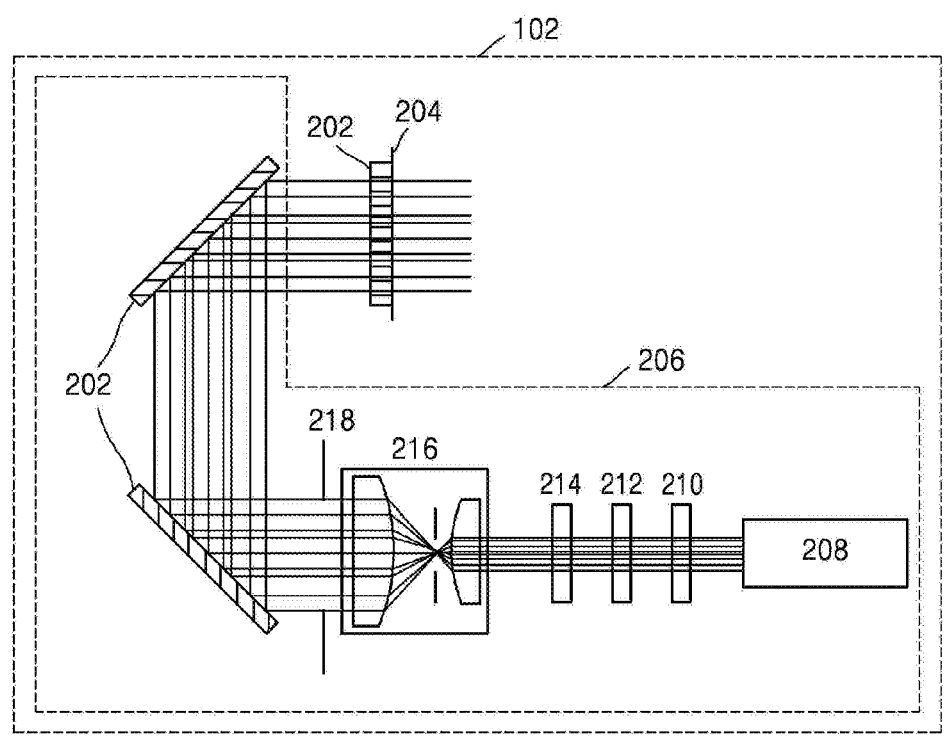

FIGS. 2A through 2C illustrate designs of the display 102 in accordance with example embodiments of the present disclosure. As shown, the display 102 may include a spatial light modulator (SLM) 202, an exit plane 204 of the SLM 202, and may also include an SLM illuminator 206 (see FIGS. 2B-2C) in case when the SLM 202 requires illumination for its operation.

The SLM 202 may be based on any type of LCD (Liquid Crystal Display), LCoS (Liquid Crystal on Silicon), FLCoS (Ferroelectric Liquid Crystal on Silicon), DMD (Digital Micromirror Device), MEMS (Microelectromechanical Systems), OLED (organic light emitting diode), OASLM (Optically Addressed Spatial Light Modulator), or EOSLM (Electro-Optic Spatial Light Modulator) technology or any other SLM technology using at least one light modulating element. As noted above, the display 102 may generate the spatial light distribution pattern at the exit plane 204 of the SLM 202, and the spatial light distribution pattern represents at least a part of the displayed image.

FIG. 2A shows an example embodiment where the SLM 202 may operate without illumination. In this case, the SLM 202 directly receives the control signal from the ECU 112 and generates the spatial light distribution pattern.

FIG. 2B illustrates an example embodiment where the SLM 202 is illuminated during operation. In this case, the SLM illuminator 206 may illuminate the SLM 202 with an illumination beam. As shown in FIG. 2B, the SLM illuminator 206 may include at least one light source 208, a polarizer 210, a polarization adjusting element 212, a diffuser 214, an illumination beam expander 216 with an aperture having a variable size, an exit aperture 218, a Field of View (FOV) folding mirror 220 and a polarizing beam-splitter (PBS) 222. The present disclosure is not limited to the display 102 as illustrated in FIG. 2B, and the number and arrangement of the constructive components 202-222 may be configured according to an application. The operation of the SLM Illuminator 206 will be now described in more detail.

The light source 208 may generate an illumination beam of at least one wavelength. The illumination beam is then polarized by the polarizer 210, and a first polarization state of the illumination beam is then adjusted by the polarization adjusting element 212. The polarization adjusting element 212 may be integrated within the polarizer 210. The diffuser 214 may be set at the front focal plane a lens (for example, a convex or concave lens) of the illumination beam expander 216 and the diffuser 214 may scatter the illumination beam in a desired direction or directions. By varying the size of the aperture of the illumination beam expander 216 (for example, by selecting and adjusting lenses), one can obtain required illumination beam divergence to improve uniformity in the displayed image. The exit aperture 218 crops— i.e. focuses or controls the width of—the expanded illumination beam, improving uniformity in intensity distribution at the transverse section of the expanded illumination beam, while considering a trade-off between the required uniformity and optical efficiency of the SLM illuminator 206. The FOV folding mirror 220 may adjust the optical axis of the illumination beam and adjust or resize geometrical dimensions thereof. The PBS 222 may reflect and direct the illumination beam to the SLM 202. When the PBS 222 receives the illumination beam, the illumination beam is in a first polarization state, and after the PBS 222 reflects and directs the illumination beam, the illumination beam is in a second polarization state. That is, the PBS 222 may change the polarization state of the illumination beam. The illumination beam reflected from and spatially modulated by the SLM 202 may pass through the PBS 222 to the image relay and optical filter 104 and be transmitted to the spatial-to-angular distribution transformer 106 of the display device 100 (in the case in which preliminary image scaling or filtering is not required) as the spatial light distribution pattern. Alternatively, in the case in which preliminary image scaling or filtering is not required, the illumination beam reflected from and spatially modulated by the SLM 202 may be directly transmitted to the spatial-to-angular distribution transformer 106 of the display device 100. In some non-limitative embodiments, the first polarization state may be an s-state, and the second polarization state may be a p-state, or vice versa.

As shown in FIG. 2C, according to an example embodiment, the SLM illuminator 206 does not include the PBS 222. To illuminate the SLM 202, two FOV folding mirrors 220 included in the SLM illuminator 206 may reflect the illumination beam directly to the SLM 202. Like numbered components shown in FIGS. 2B and 2C refer to the same or similar elements, and repeated description thereof is omitted. In this case, the SLM 202 should be configured to transmit (without reflection) the illumination beam such that the illumination beam forms the spatial light distribution pattern at the exit plane 204. Similarly, the spatial light distribution pattern may be provided either to the image relay and optical filter 104, or directly to the spatial-to-angular distribution transformer 106 of the display device 100 (in the case in which preliminary image scaling or filtering is not required). A further difference between the designs shown in FIGS. 2B-2C is that in FIG. 2C, given the absence of the PBS 222, the polarization state of the illumination beam changes only once.

Furthermore, the example embodiments shown in FIGS. 2B-2C imply that the light source 208 may receive the control signal from the ECU 112 and, in response to the control signal, generate the illumination beam at a required wavelength corresponding to the sequence of image frames from the external image source.

Figure 3:
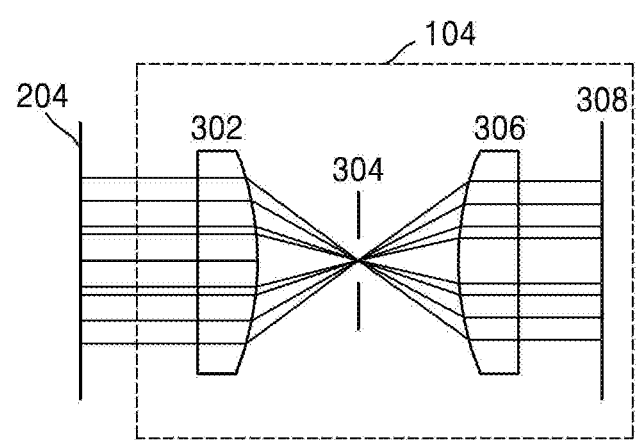
FIG. 3 illustrates one possible scheme of an image relay and optical filter in accordance with an example embodiment of the present disclosure.

FIG. 3 illustrates a design of the image relay and optical filter 104 in accordance with an example embodiment of the present disclosure. As shown, the image relay and optical filter 104 may include a first lens 302, an aperture 304, and a second lens 306. The image relay and optical filter 104 may be incorporated into the display device 100 as necessary to filter the spatial light distribution pattern from high order diffraction occurring due to the diffraction of the illumination beam by the SLM 202 as a result of small pixel size of the SLM 202. Thus, the image relay and filter 104 may be used in the display device 100 to improve the quality of the displayed image and for preliminary scaling thereof. The preliminarily scaled and filtered (cleared) spatial light distribution pattern is provided at an exit plane 308. As noted above, the display device 100 can also operate in the case in which the image relay and optical filter 104 is omitted from the display device 100, with some degradation of the image quality, which will have no significant impact on the above-indicated technical result. Other embodiments of the image relay and optical filter 104 are possible, in which a different number of lenses and apertures are used depending on the application.

Figure 4A:
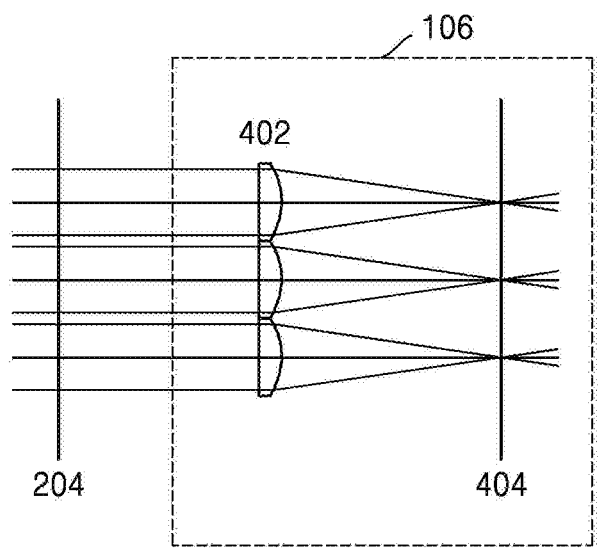
FIGS. 4A through 4B illustrate two possible schemes of a spatial-to-angular distribution transformer in accordance with example embodiments of the present disclosure.
Figure 4B:
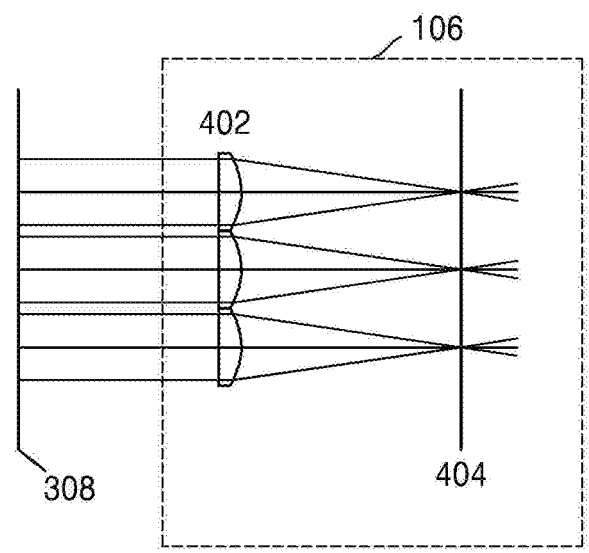

FIGS. 4A through 4B illustrate a design of the spatial-to-angular distribution transformer 106 in accordance with example embodiments of the present disclosure. As shown, the spatial-to-angular distribution transformer 106 may include one or more transforming elements 402. The spatial-to-angular distribution transformer 106 may transform the spatial light distribution pattern provided on the exit plane 204 of SLM 202 (see FIG. 4A) or the exit plane 308 of the image relay and optical filter 104 (see FIG. 4B) to an angular light distribution pattern at the exit plane of the spatial-to-angular distribution transformer 106. The angular spread of directional views (parallax images) formed at an exit plane 404 of the spatial-to-angular distribution transformer 106 is proportional to the aperture size and optical power of the transforming elements 402. Moreover, the number of directional views as formed is inversely proportional to the pixel size of the SLM 202 and the magnification of the image relay and optical filter 104 (if included and used in the device 100). The transforming elements 402 may be arranged as a 1D or 2D array of transforming elements with symmetrical or anamorphic properties, which may result in the formation of parallax directional views (horizontal only, vertical only, or full) of the displayed image. Moreover, each of the transforming elements in such an array represents an elementary integral image part containing directional parallax views. In other words, each of the transforming elements may generate an integral image pixel which may be seen differently from different viewpoints. The set of such integral image pixels forms the entirety of a 3D image. If the display device 100 operates in a 2D mode, the parallax directional views are set to be equal (e.g., all horizontal only, or all vertical only). The display device 100 may also operate in a stereoscopic mode, by generating two different sets of parallax images. The transforming elements 402 may be concave or convex lenses but not limited thereto.

Figure 5:
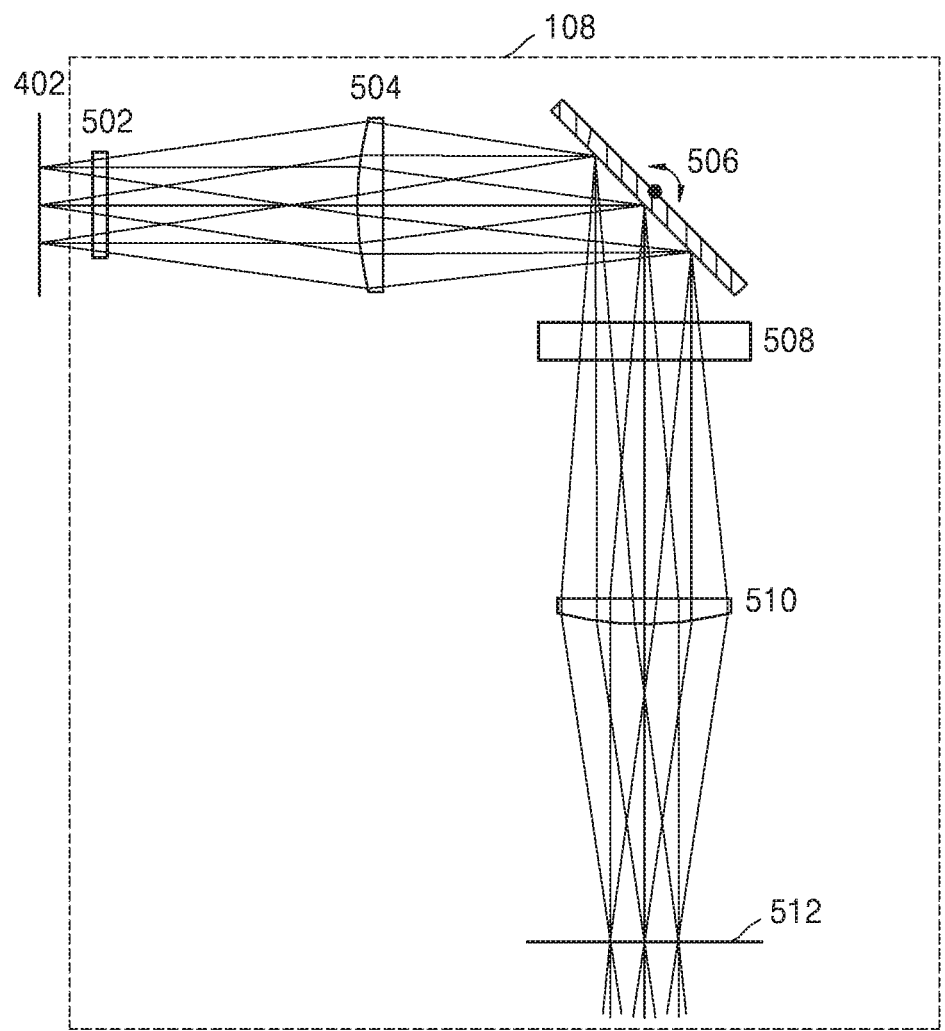
FIG. 5 illustrates one possible scheme of an image relay and scanner in accordance with an example embodiment of the present disclosure.

FIG. 5 illustrates a design of the image relay and scanner 108 in accordance with an example embodiment of the present disclosure. As shown, the image relay and scanner 108 may include a first anamorphic lens 502, a second anamorphic lens 504, a scanner 506, a third anamorphic lens 508, a fourth anamorphic lens 510, and an exit plane 512 (which is aligned with the screen 110). The image relay and scanner 108 may relay, magnify and scan the parallax images formed at the exit plane 404 of the spatial-to-angular distribution transformer 106 and produce an enlarged output 3D image at the exit plane 512 having a wider viewing angle. The first anamorphic lens 502 and the third anamorphic lens 508 may relay the parallax images with magnification (e.g., an increase in size) in the first direction of the image from the exit plane 404 of the spatial-to-angular distribution transformer 106 to the exit plane 512 of the image relay and scanner 108. The second anamorphic lens 504 and the fourth anamorphic lens 510 may relay the parallax images with magnification (e.g., an increase in size) in the second direction (perpendicular to the first direction) from the exit plane 404 of the spatial-to-angular distribution transformer 106 to the exit plane 512 of the image relay and scanner 108. If such angular magnification is more than 1, one can obtain a wider viewing angle for the displayed image. The scanner 506 may move (e.g., position or reposition) the parallax images in at least one of the first and second directions such that there is no gap or overlap between the parallax images in the at least one of the first and second directions. Thus, the image relay and scanner 108 may provide a fused image (e.g., an image formed from a combination of parallax images which have been magnified and corrected for deviations) at the exit plane 512. The fused image is a magnified version of the initially supplied image (which includes a sequence of image frames) received from the external image source.

The scanner 506 may be of any type suitable for moving (e.g., positioning or repositioning) the parallax images to correct any deviations. For example, operation of the scanner 506 may be based on an electro-optical effect, a magneto-optical effect, a piezo-optical effect, any combination thereof, or on any effect by which a change in properties of an optical medium (based on an applied external field such as, for example, an electric or magnetic field) leads to light beam deviation. Furthermore, in an example embodiment, the scanner 506 may include a mirror mounted on a shaft and a driver coupled to the shaft and configured to drive rotation of the mirror about a shaft axis, thus providing the above-mentioned movement (e.g., positioning or repositioning) in said at least one of the first and second directions. The movements may be adjusted by the control signal from the ECU 112. For example, the control signal may include data indicating in what direction and how to move (e.g., position, reposition, rotate) the scanner 506, and the driver may drive the scanner 506 to move according to the data. The data may include, for example, deviation amplitude.

As noted above, the screen 110 may display the 3D or 2D image to the viewer. The screen 110 may be set, at the exit plane 512 as described above, e.g., at the place where the displayed image is projected and finally formed. The screen 110 may be transmissive (see FIG. 1A), reflective (see FIG. 1B), or partially transmissive and reflective, or the screen 110 may have diffusing properties so that the viewer can observe the 3D image from a location either in front of the screen 110 or behind the screen 110 (e.g., between the image relay and scanner 108 and the screen 110). The screen 110 should meet at least the following two main requirements regarding diffusing properties: a sufficiently large diffusing angle in at least one of the first and second directions (for example, in at least one of the horizontal and vertical directions) increases the viewing angle of the displayed 3D image in said at least one of the first and second directions, thereby improving viewing conditions for the viewer; and sufficiently low diffusion or absence thereof in the direction where the parallax images are formed, thereby resulting in little to no distortion in the set of the formed parallax images.

The ECU (controller) 112 may control the operation of the display device 100. The ECU 112 may receive a video signal containing coded 3D image data (for example, the sequence of frame images), process the video signal, and send a control signal to the display 102, while providing continuous synchronization between the display 102, the light source 208, if incorporated, and the scanner 506. The synchronization performed by the ECU 112 is directed to display of a sharp 3D image having an increased image size and consisting of one or more image frames or sub-frames which tile the whole area of the exit plane 512 of image relay and scanner 108, without overlap or gaps between parallax images, and have high uniformity. The ECU 112 may be implemented, for example, as one or more processors.

The above-described constructive components of the display device 100 may be linked with each other as shown in FIGS. 1A-1B to produce a set of directional views (parallax images) to generate a displayed increased 3D image having a wider viewing angle.

Figure 6:
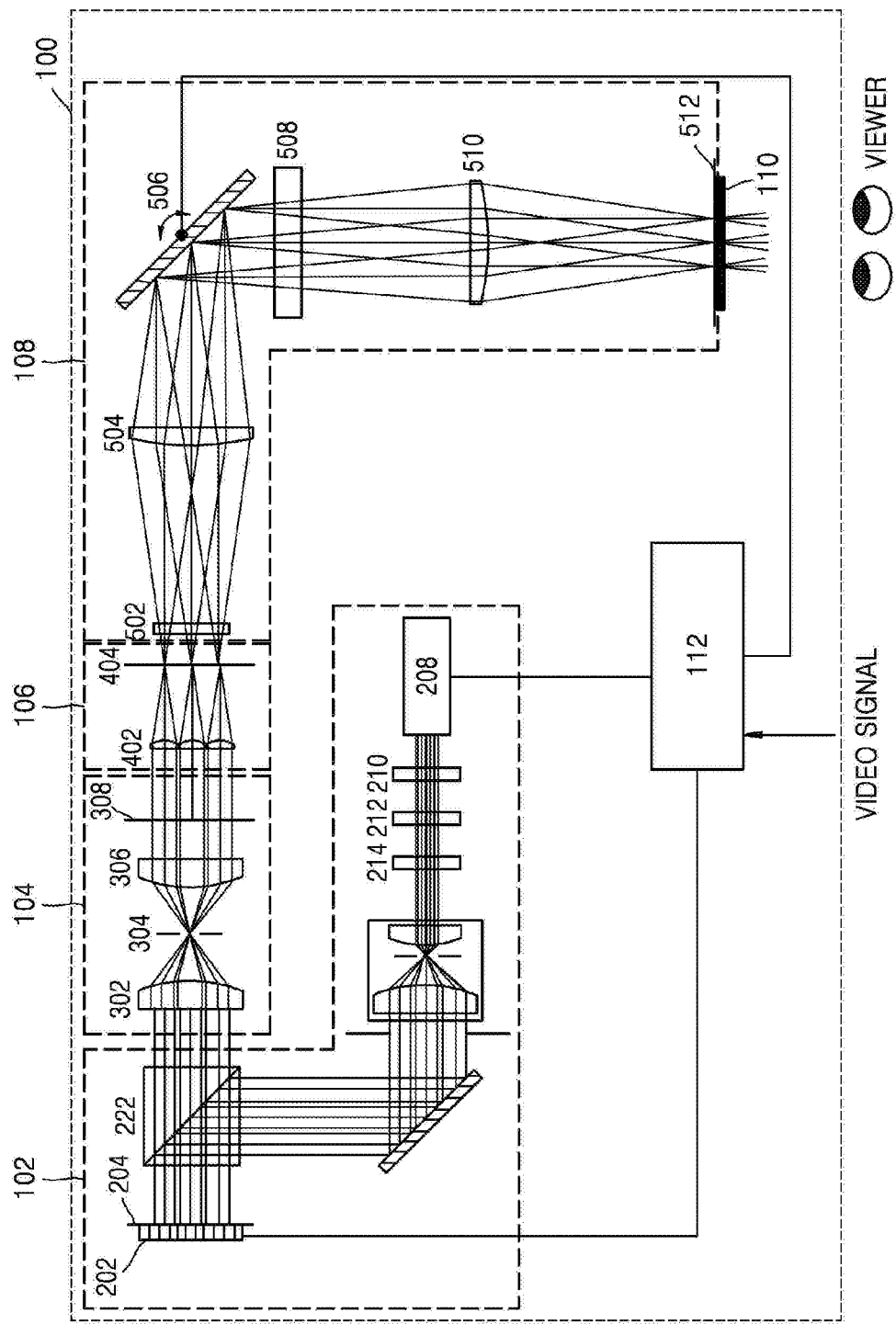
FIG. 6 illustrates the scheme of the display device in accordance with a preferred embodiment of the present disclosure.
Figure 7A:
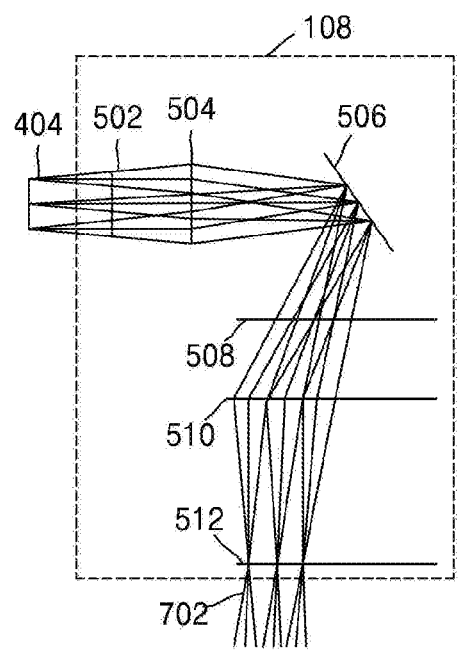
FIGS. 7A through 7D explain the operation of the image relay and scanner in accordance with example embodiments of the present disclosure.
Figure 7B:
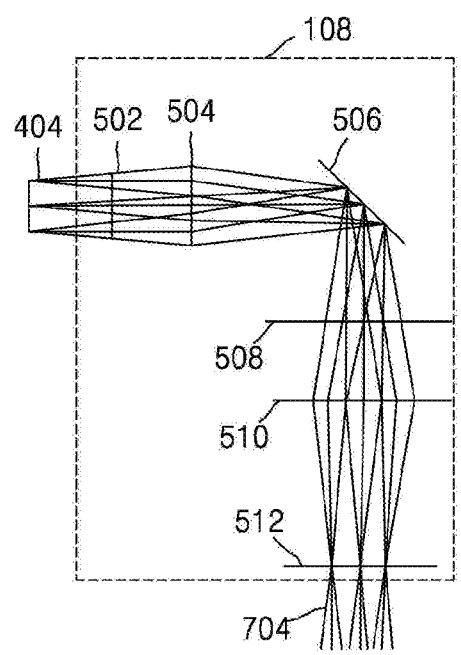
Figure 7C:
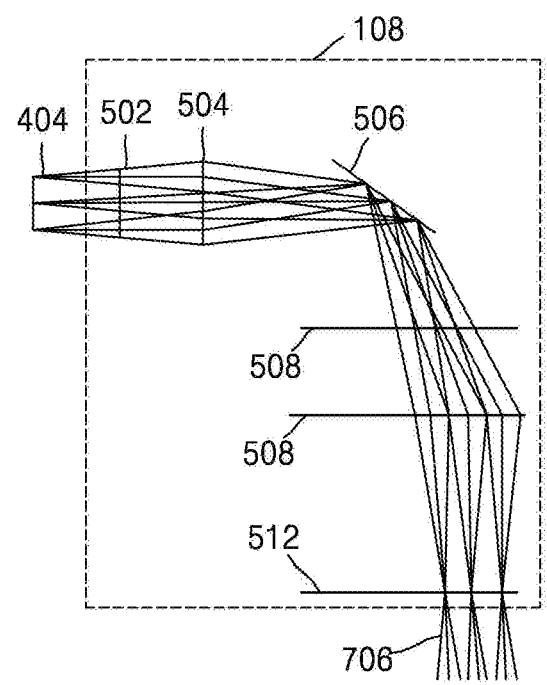
Figure 7D:
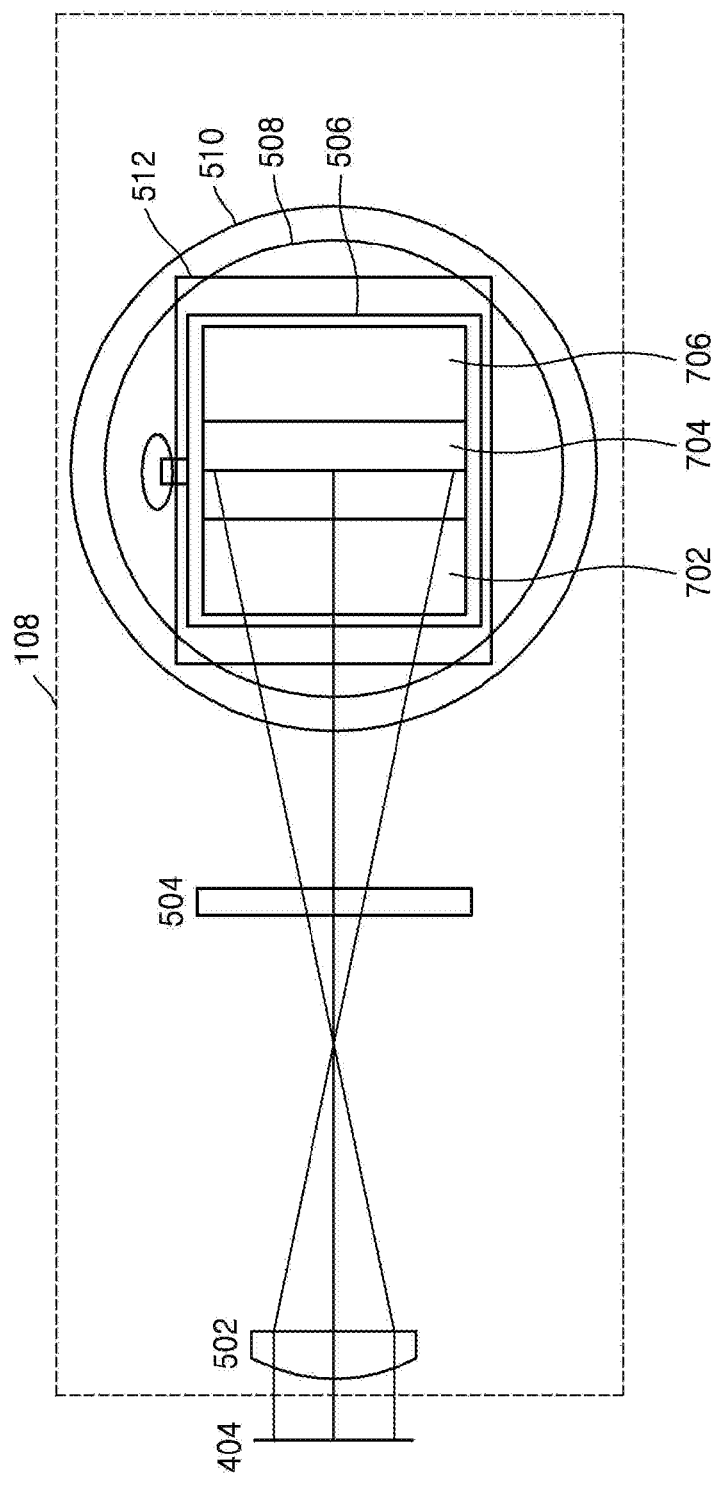

Another embodiment of the display device 100 is shown in FIG. 6. In FIG. 6, the display device 100 may include a display 102, an image relay and optical filter 104, a spatial-to-angular distribution transformer 106, an image relay and scanner 108, a screen 110, and a controller (ECU: an Electronic Controlling Unit) 112. A video signal containing 3D image data including a sequence of frames or sub-frames generated by a PC video adapter, for example, is sent to the ECU 112. The ECU 112 processes the video signal and sends coded 3D image data for frames or sub-frames (i.e. the control signal) to the SLM 202 illuminator. If the display device 100 includes the light source 208, as in the SLM illuminator 206 according to the previous example embodiments, the ECU 112 may send the control signal to the light source 208, enable or disable the illumination of the SLM 202, and provide the modulation of an illumination beam to improve image sharpness. The ECU 112 may also send a control signal to the scanner 506, thereby adjusting a position of the scanner 506 such that the scanner 506 tiles the entirety of the exit plane 512 of the image relay and scanner 108 with frames or sub-frames, wherein the position of the screen 110 coincides with the position of the exit plane 512. The frame or sub-frames of the coded 3D image data are consequently displayed on the SLM 202, forming consequently a spatial light distribution pattern at the exit plane 204 of the SLM 202 for further scanning for the purpose of tiling and increasing screen size. Thus, the spatial light distribution pattern formed at the exit plane 204 of the SLM 202 is relayed to the exit plane 308 of the image relay and optical filter 104 with a preliminary scaling (e.g., magnification) defined by a factor M0=f'306/f'302, where f'306 is the back focal length of the second lens 306 of the image relay and optical filter 104, and f'302 is the back focal length of the first lens 302 of the image relay and optical filter 104, and is filtered from high diffraction orders produced due to a pixel array of pixels having a small-size in the SLM 202. Then, the spatial light distribution pattern as filtered and preliminarily scaled by the factor M0 is transformed to an angular light distribution pattern by the spatial-to-angular distribution transforming element 106. The spatial-to-angular distribution transforming element 106 may be, for example, a lenticular lens raster. The optical properties of the spatial-to-angular distribution transformer 106, namely, the back focal length f'402 and the lens pitch p402, define the viewing angle 2 θ of the proposed display device 100: 2θ=2*arctan(p402/(2*f'402)). Also, the lens pitch p402 and the SLM 202 pixel pitch p202 define the maximal number (Nviews) of the displayed views of the displayed 3D image: Nviews=p402/p202, and choosing a lens pitch p402 value and SLM 202 pixel pitch p202 value such that the remainder when dividing lens pitch p402 by pixel pitch p202 is zero or close to zero may eliminate or minimize cross-talk and angular shifts between the views. To achieve a wider viewing angle, it is necessary to choose an increased lens pitch p402 and increased optical power 1/f'402 of the transforming element 402. However, it is inherent in the integral imaging technology that, when pixel pitch p202 is held constant, 3D image resolution decreases as lens pitch p402 increases. Therefore, a trade-off between the 3D display resolution and the viewing angle may be achieved based on choice of parameters of the SLM 202 and the transforming element 402 for meeting requirements applied to the display device 100. Thus, at the exit plane 404 of the spatial-to-angular distribution transformer 106, the angular light distribution pattern may be obtained, which is represented by the directional views (parallax images) of the respective image sub-frames, with the viewing angle being defined by the optical properties of the transforming element 402. Then, the parallax images are relayed to the exit plane 512 of the image relay and scanner 108, while being magnified in the vertical direction and de-scaled in the horizontal direction by first and second anamorphic lens pairs each made of two anamorphic lenses. The first anamorphic lens pair, formed of the first anamorphic lens 502 and the third anamorphic lens 508, has a magnification in the vertical direction defined as M1=f'508/f'502, where f'508 is the back focal length of the third anamorphic lens 508 and f'502 is the back focal length of the first anamorphic lens 502. The second anamorphic lens pair, formed of the second anamorphic lens 504 and the fourth anamorphic lens 510, has a magnification in the vertical direction defined as M2=f'510/f'504, where f'510 is the back focal length of the fourth anamorphic lens 510 and f'902 is the back focal length of the second anamorphic lens 504. Moreover, if 0<|M2|<1, which means the demagnification of sub-frame size in the horizontal direction (i.e., decrease in sub-frame size), one can obtain an increased viewing angle of the parallax images constituting the whole 3D image, due to known properties of a telescopic lens system. In order to obtain increased image size of the 3D image in the vertical direction, |M1| must be greater than 1 (i.e., |M1|>1).

The scanner 506 of the image relay and scanner 108 may move (e.g., position or reposition) image frames or sub-frames in the horizontal direction (see FIGS. 7A-7D), thereby tiling the entirety of the exit plane 512 with the image frames or sub-frames (e.g., output 3D sub-frames formed on the left side, in the center, and on the right side of the exit plane 512,) without overlap or gaps between the image frames or sub-frames, in order to generate a 3D image increased in the horizontal direction and having increased resolution compared to each of the individual image frames or sub-frames (i.e., output 3D sub-frames). The number of individual image frames or sub-frames (i.e., output 3D sub-frames) used in generating the 3D image is at least one, and, for example, may be greater than one. The number may be selected, for example, by the ECU 112, based on the display device 100 parameters and algorithms executed by the ECU 112. The scanner 506 may operate as fast as necessary to provide the viewer with a 3D image clearly visible to the user, in which the user is not required to adjust his view (e.g., by blinking, squinting, etc.) in order to improve user perception of the 3D image. The scanner 506, may display the sub-frames during the first portion of relay and scanning (e.g., relay to the exit plane 404), or during both the first portion and the second portion (e.g., relay to the exit plane 512) of relay and scanning.

The proposed disclosure may operate not only in a 3D mode but also in a 2D mode, in which the angular spread of directional views (e.g. all parallax images) as formed are the same, i.e. invariant to changes in the viewing angle, and a 2D image is displayed to the viewer.

Figure 8A:
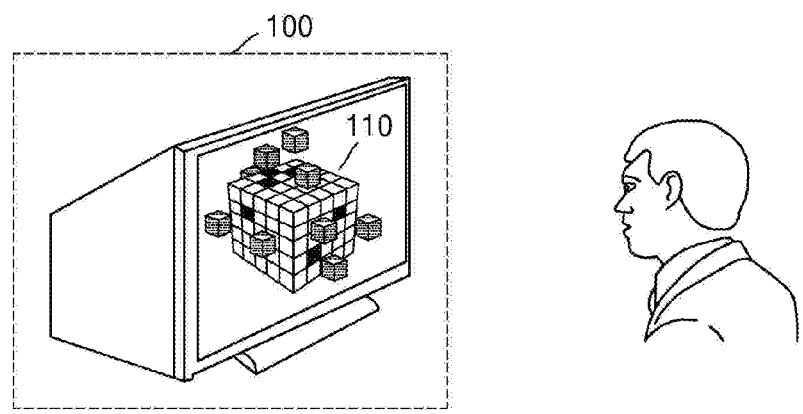
FIGS. 8A through 8C illustrate three possible implementations of the display device in accordance with example embodiments of the present disclosure.
Figure 8B:
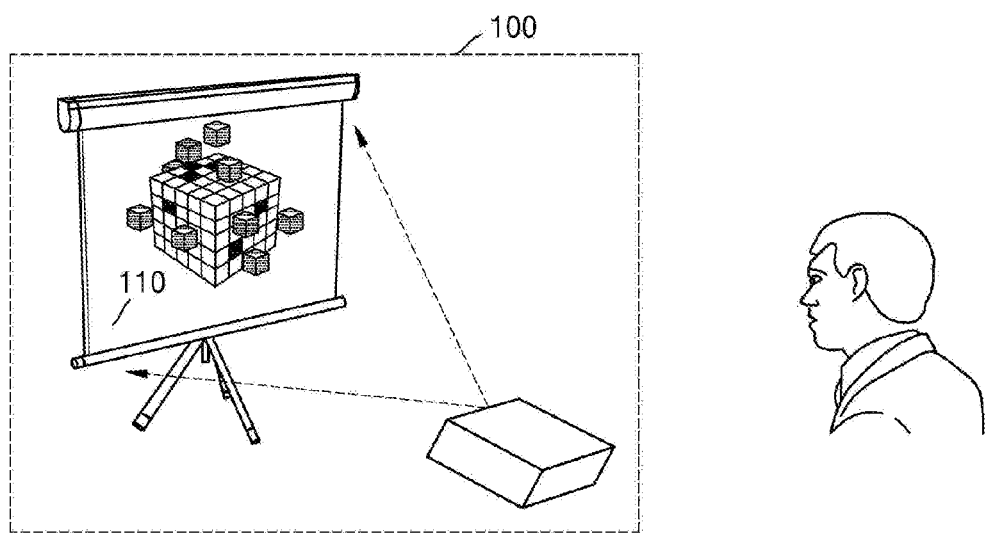
Figure 8C:
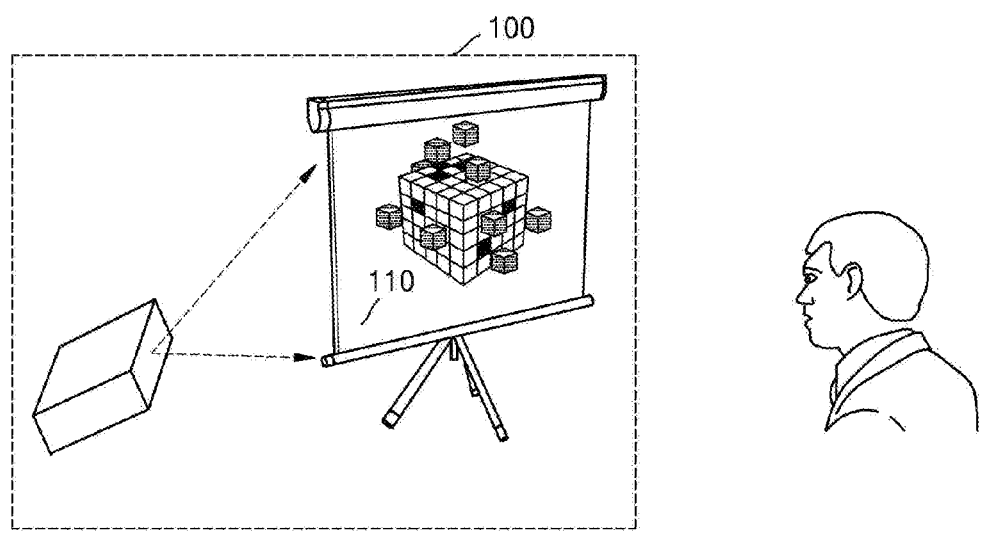

FIGS. 8A through 8C show different example embodiments of the display device 100 according to the present disclosure. In the example embodiment shown in FIG. 8A, the display device 100 and the screen 110 thereof are integrated into a monitor or TV unit. In the example embodiment shown in FIG. 8B, the screen 110 of the display device 100 is provided in a front projection configuration, i.e. an image is projected on the screen from the same side as a viewer's position. In the example embodiment shown in FIG. 8C, the screen 110 of the display device 100 is provided in a rear projection configuration, i.e. an image is projected on the screen from a side opposite a viewer's position.

The disclosed above invention may be used not only as a stand-alone 3D display unit, but also as a part of various devices, including, but not limited to, TVs, projectors, devices for augmented reality, etc.

Whether the proposed display device operates as a stand-alone display or as part of another device, the principles of the operation thereof and the technical result remain the same.

Figure 9:
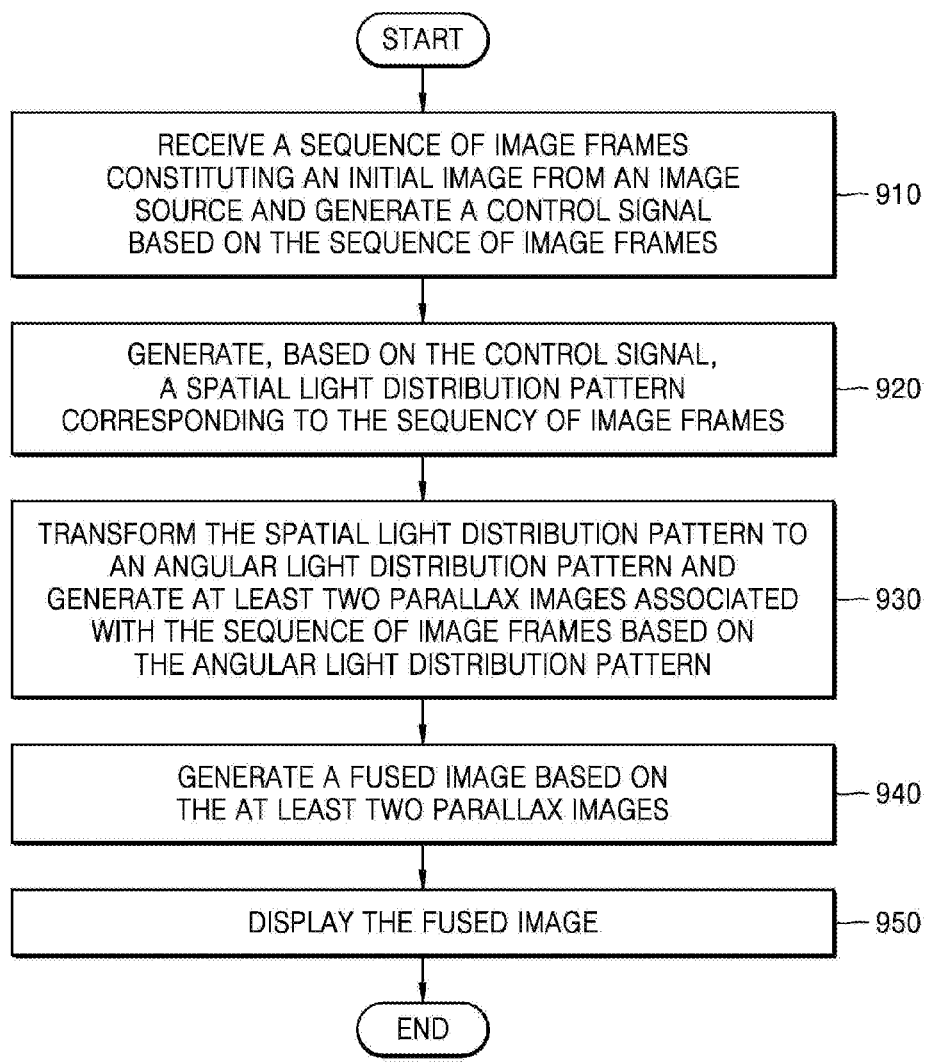
FIG. 9 is a flow diagram illustrating of a displaying method in accordance with another example embodiment of the present disclosure.

FIG. 9 is a flow diagram illustrating of a displaying method in accordance with another example embodiment of the present disclosure.

At step 910, a controller (ECU) 112 may receive a sequence of image frames constituting an initial image from an image source and generates a control signal based on the sequence of image frames. Next, at step 920, a display 102 may generate, based on the control signal, a spatial light distribution pattern corresponding to the sequency of image frames. In generating such a spatial light distribution pattern, the display 102 may receive instructions from the ECU 112. In particular, the ECU 112 may provide the display 102 with a control signal indicating a spatial light distribution pattern to be generated by the display 102. The sequence of frames may be sent from an external image source, such as a video camera. At step 930, a spatial-to-angular distribution transformer 106 may transform the spatial light distribution pattern to an angular light distribution pattern and generate at least two parallax images associated with the sequence of image frames based on the angular light distribution pattern. Next, at step 940, an image relay and scanner 108 may generate a fused image based on the at least two parallax images. Finally, at step 950, a screen may display the fused image.

Figure 10:
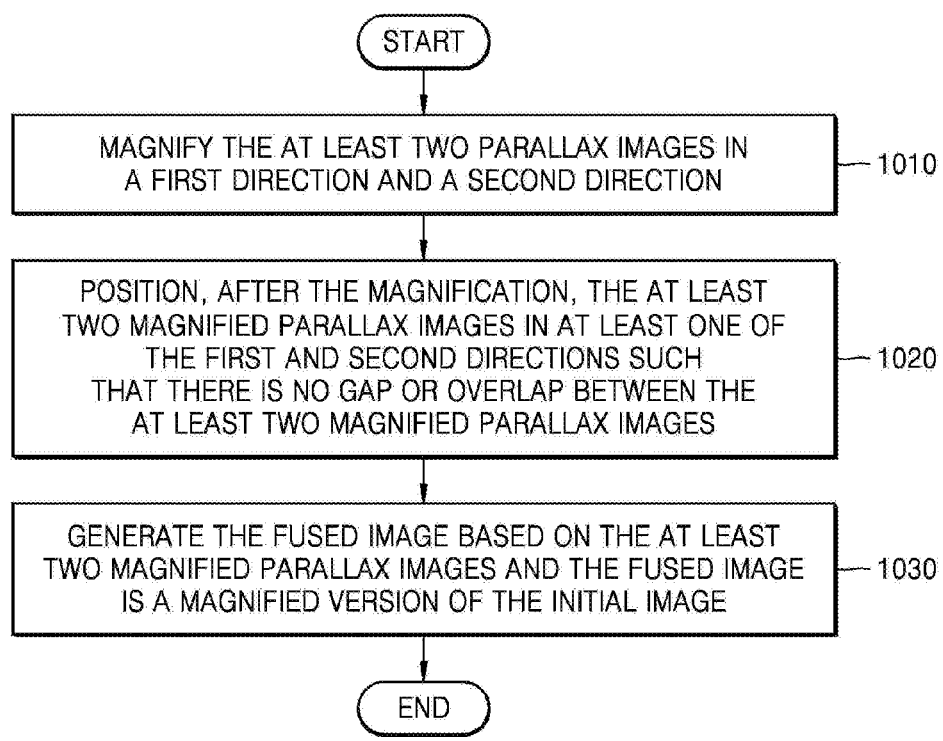
FIG. 10 is a flow diagram illustrating of a method of generating a fused image in accordance with another example embodiment of the present disclosure.

FIG. 10 is a flow diagram illustrating of a method of generating a fused image in accordance with another example embodiment of the present disclosure. FIG. 10 illustrates detailed description of how to generate the fused image by the image relay and scanner 108.

At step 1010, the image relay and scanner 108 may magnify the at least two parallax images in a first direction and a second direction. The first direction may be perpendicular to the second direction. Next, at step 1020, the image relay and scanner 108 may position, after the magnification, the at least two magnified parallax images in at least one of the first and second directions such that there is no gap or overlap between the at least two magnified parallax images. Finally, at step 1030, the image relay and scanner 108 may generate the fused image based on the at least two magnified parallax images and the fused image is a magnified version of the initial image.

Although the example embodiments of the present disclosure are disclosed herein, it should be noted that any various changes and modifications may be made in the example embodiments of the present disclosure, without departing from the scope of legal protection which is defined by the appended claims. In the appended claims, the mention of elements in a singular form does not exclude the presence of the plurality of such elements, if not explicitly stated otherwise.

The invention claimed is:

1. A display device comprising:
a screen; and
at least one processor configured to obtain a sequence of image frames constituting an initial image from an external image source and generate a control signal based on the obtained sequence of image frames;
a display configured to generate, based on the control signal, a spatial light distribution pattern corresponding to the sequence of image frames;
a spatial-to-angular distribution transformer configured to transform the spatial light distribution pattern to an angular light distribution pattern and generate at least two parallax images associated with the sequence of image frames based on the angular light distribution pattern; and
an image relay and scanner configured to magnify the at least two parallax images and generate a fused image, the fused image being a magnified version of the initial based on the at least two magnified parallax images;
wherein the at least one processor is further configured to control the screen to display the fused image.

2. The device of claim 1, wherein the image relay and scanner is further configured to:

magnify the at least two parallax images in a first direction and a second direction, the first direction being perpendicular to the second direction; and
position, after the magnification, the at least two magnified parallax images in at least one of the first and second directions such that there is no gap or overlap between the at least two magnified parallax images.

3. The device of claim 1, wherein the display comprises:
a spatial light modulator (SLM); and
an SLM illuminator configured to illuminate the SLM.

4. The device of claim 3, wherein the SLM illuminator comprises:
at least one light source configured to generate an illumination beam;
a polarizer configured to polarize the illumination beam such that the illumination beam is in a first polarization state;
a diffuser configured to diffuse the illumination beam, wherein the diffusing includes scattering the illumination beam;
an illumination beam expander configured to expand the diffused illumination beam output by the diffuser;
an exit aperture configured to crop the expanded illumination beam;
folding mirrors configured to reflect the illumination beam after cropping by the exit aperture; and
a polarizing beam-splitter (PBS) configured to reflect and direct the illumination beam reflected from the folding mirrors to the SLM,
wherein, after reflection by the PBS, the illumination beam is in a second polarization state different from the first polarization state, and
wherein, the SLM is further configured to reflect and spatially modulate the illumination beam, and after the illumination beam is reflected from and spatially modulated by the SLM, the PBS is configured to transmit the illumination beam towards the spatial-to-angular distribution transformer as the spatial light distribution pattern.

5. The device of claim 4, wherein the first polarization state is an s-state, and the second polarization state is a p-state, or vice versa.

6. The device of claim 4, wherein the illumination beam expander comprises an aperture having a variable size.

7. The device of claim 3, wherein the SLM is based on at least one selected from Liquid Crystal Display, Liquid Crystal on Silicon, Ferroelectric Liquid Crystal on Silicon, Digital Micromirror Device, Microelectromechanical Systems, Organic Light Emitting Diode, Optically Addressed Spatial Light Modulator, and Electro-Optic Spatial Light Modulator technologies.

8. The device of claim 1, further comprising an image relay and optical filter arranged between the display and the spatial-to-angular distribution transformer and configured to scale and filter the spatial light distribution pattern generated by the display before the spatial-to-angular distribution transformer transforms the spatial light distribution pattern to the angular light distribution pattern.

9. The device of claim 8, wherein the image relay and optical filter comprises one or more lenses and one or more apertures.

10. The device of claim 1, wherein the spatial-to-angular distribution transformer comprises a 1D or 2D array of transforming elements having symmetrical or anamorphic properties, each of the transforming elements being configured to generate an image pixel which is seen differently by a user based on a viewpoint of the user.

11. The device of claim 1, wherein the screen is transmissive or reflective, is partially transmissive and reflective, or has diffusing properties.

12. The device of claim 1, wherein the image relay and scanner comprises:
- at least one anamorphic lens system configured to magnify the at least two parallax images in a first direction, by a value greater than one, and in a second direction, by a value less than one;
- a scanner configured to position the at least two magnified parallax images in the at least one of the first and second directions; and
- a driver configured to drive movement of the scanner.

13. The device of claim 12, wherein the control signal comprises data indicating movement of the scanner, the movement including a deviation amplitude, and the driver is configured drive movement of the scanner for repositioning the at least two magnified parallax images, based on the control signal.

14. The device of claim 13, wherein size and resolution of the fused image in the at least one of the first and second directions is proportional to the deviation amplitude.

15. The device of claim 12, wherein the scanner comprises at least one mirror and a shaft on which the at least one mirror is mounted, the shaft being coupled to the driver,
- wherein the driver is configured to drive rotation of the shaft about a shaft axis, and the rotation of the shaft moves the at least one mirror in the at least one of the first and second directions.

16. The device of claim 12, wherein the operation of the scanner is based on an electro-optical effect, a magneto-optical effect, a piezo-optical effect, or a combination thereof.

17. The device of claim 16, wherein the driver is configured to induce the electro-optical effect, magneto-optical effect, piezo-optical effect, or combination thereof, by applying at least one of an external electric field and a magnetic field to the scanner.

18. The device of claim 1, wherein the device is integrated into or implemented as one of: a monitor, a TV, a projector, and an augmented reality device.

19. A displaying method comprising:
- obtaining, by at least one processor, a sequence of image frames constituting an initial image from an image source;
- generating, by the at least one processor, a control signal based on the sequence of image frames;
- generating, by the at least one processor, based on the control signal, a spatial light distribution pattern corresponding to the sequence of image frames;
- transforming, by the at least one processor, the spatial light distribution pattern to an angular light distribution pattern;
- generating, by the at least one processor, at least two parallax images associated with the sequence of image frames based on the angular light distribution pattern;
- magnifying, by the at least one processor, the at least two parallax images; and
- controlling, by the at least one processor, to display a fused image, the fused image being a magnified version of the initial image generated based on the at least two magnified parallax images.

20. The method of claim 19, further comprising:
- magnifying, by the at least one processor, the at least two parallax images in a first direction and a second direction, the first direction being perpendicular to the second direction; and
- positioning, by the at least one processor, the at least two magnified parallax images in at least one of the first and second directions such that there is no gap or overlap between the at least two magnified parallax images.

* * * * *